Figure 1:
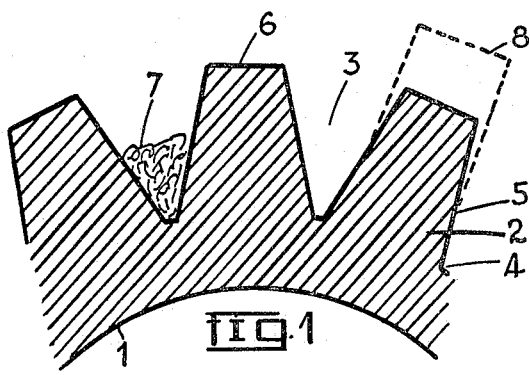

INVENTOR.
CHARLES A. E. BEURTHERET
BY Stephen H. Frishauf
Atty

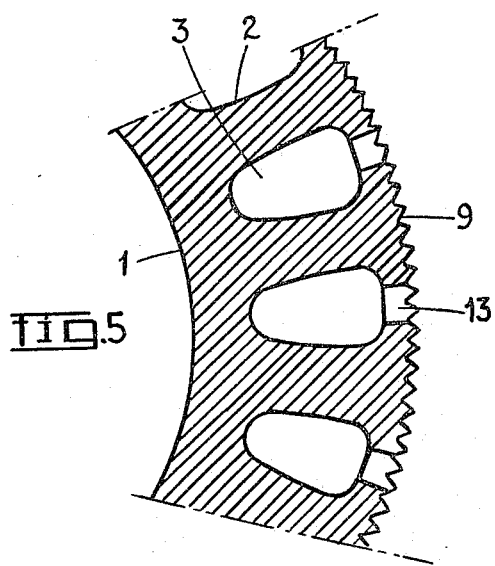
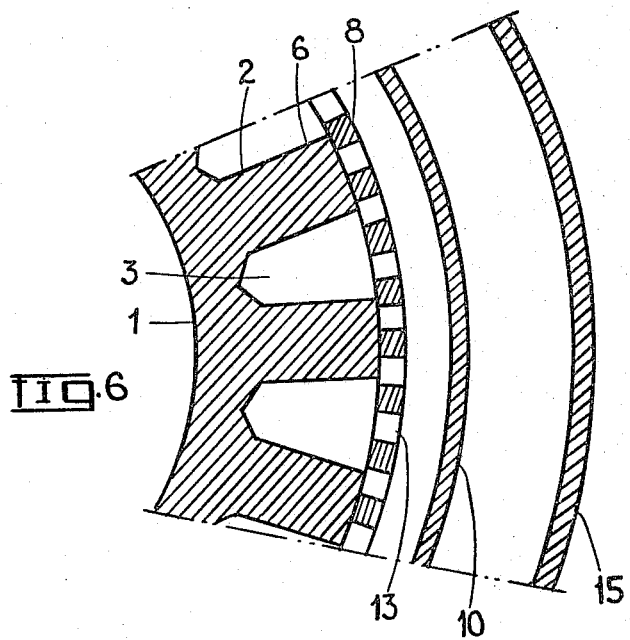

United States Patent Office 3,299,949
Patented Jan. 24, 1967

3,299,949
DEVICE FOR EVAPORATIVE COOLING OF BODIES, AND PARTICULARLY POWER VACUUM TUBES
Charles A. E. Beurtheret, Saint-Germain-en-Laye, France, assignor to Compagnie Francaise Thomson Houston-Hotchkiss Brandt, Paris, France, a corporation of France
Original application Apr. 29, 1960, Ser. No. 25,794. Divided and this application Dec. 14, 1965, Ser. No. 513,738
Claims priority, application France, Oct. 13, 1959, 807,348, 807,349
11 Claims. (Cl. 165—185)

The present application is a divisional application of my prior patent application Ser. 25,794, filed Apr. 29, 1960 now abandoned.

The present invention relates to the cooling of bodies in which a large amount of heat must be dissipated with a high thermal flux density, without the heated body exceeding a maximum permitted temperature; and in particular to the cooling of high-power electronic tubes.

The following description will refer more especially to the cooling of power vacuum tubes as an example, without however being limited thereto.

The invention specifically relates to an arrangement in which the cooling is effected essentially by the vaporization of a liquid in which the hot body is either wholly or partially immersed. Examples of such arrangements are further described in U.S. Patents 2,935,305; 2,935,306; 2,873,954; and French Patent 1,226,420 (to which British Patent 940,984 partly corresponds).

A study of the functioning of electron tubes known by applicant's trade name "Vapotron" and manufactured in accordance with the principles of the invention has shown that the device owes its surprising effectiveness to the temperature gradient along individual massive protuberances, that is between the hot base and outer end portions of the protuberances, which are kept relatively cool by a cooling liquid in which the entire tube is immersed. The cooling liquid, preferably, is water. The protuberances themselves are much larger than the bubbles formed by boiling of the cooling liquid.

It is an object of the present invention to provide an evaporative cooling arrangement for bodies with high thermal flux, especially for the anodes of electronic tubes, which have improved heat dissipation capabilities.

According to the invention, the outer end portions of the massive and thick protuberances are made thicker than adjacent portions, or provided with metal strips, to partly obstruct the channels formed between protuberances. More efficient heat transfer from the hot body to the cooling liquid is obtained, since the circulation of cooling liquid is improved and, due to the structure, the cooling liquid is forced to boil along the entire side of the protuberances as well as at the base zone thereof. The temperature of the zones where boiling occurs along the protuberances may attain, and even exceed 125° C. without any risk of loss of contact of cooling liquid with the ends of the protuberances themselves.

The invention will now be further described with reference to the accompanying drawings, in which:

FIG. 1 illustrates the principle of the invention in relation to the existing state of the art, and FIGS. 2 to 6 illustrate various embodiments of the invention.

FIG. 1 shows, in cross section, an example of a portion of an anode radiator of an existing type of "Vapotron" tube. The tube is immersed in a cooling liquid, such as water. The anode 1 is thickened and is provided with individually massive protuberances, or ribs, 2, the dimensions of which are large with respect to those of steam bubbles formed in the water. The protuberances 2 are separated by channels 3 which form vertical chimneys in which a mixture of water and steam may rapidly rise. Boiling occurs on the lateral surface of the ribs in the region of their base 4 and extends over the sides 5 when the heat to be dissipated increases.

The mixture of water and steam 7, which will form at a boiling zone is lighter than the liquid itself and its thermal siphoning action will contribute to removal of vapor. Efficient cooling depends on the presence of a cool metal mass at the outer end portions 6 of the ribs to prevent formation of a layer of steam adjacent the sides of the ribs and thus loss of liquid contact with the sides themselves, that is spheroidal state of liquid rather than heat exchange by boiling. Increase in temperature much over 25° C. above the boiling point of the cooling liquid may cause dangerous hot spots. As the heat to be dissipated increases, the boiling zone will enlarge and extend further along the sides 5 of the ribs 2. If the protuberances are sufficiently massive, and their ends 6 are exposed to not boiling liquid, the migration of this zone of heat exchanged by boiling as a function of heat to be dissipated is stable and reversible. However, when the ends 6 of ribs are engulfed by steam and no longer exposed to liquid, the heat transfer will become unstable.

To increase the maximum power which can be dissipated, it has been proposed to add to the ends 6 of each of the massive protuberances 2 and in good thermal contact therewith, auxiliary elements or extensions 8, shown in dotted lines in FIG. 1, in order to provide a definite cool zone in contact with liquid. The result will be improved cooling of the ribs in the region of the boiling zone itself; although comparatively little heat is dissipated by the extensions 8, substantial increase in the heat exchange possible by boiling at the base 4 and on the sides 5 of the protuberances is achieved so that temperatures which may even exceed appreciably the critical temperature of 125° C. may be reached without risk of flash evaporation.

According to previous proposals by the inventor, good surface contact of the end portions of the protuberances with liquid can be obtained by one or more of the following measures: the end portions may be corrugated, in order to increase their surface, whereas the internal, or boiling zone of the ribs remain smooth; and the end portions may be bent over in alternatively different directions, with respect to a median plane of the ribs themselves, in order to provide opposed, staggered projecting teeth for better heat dissipation.

Figures 2, 3:
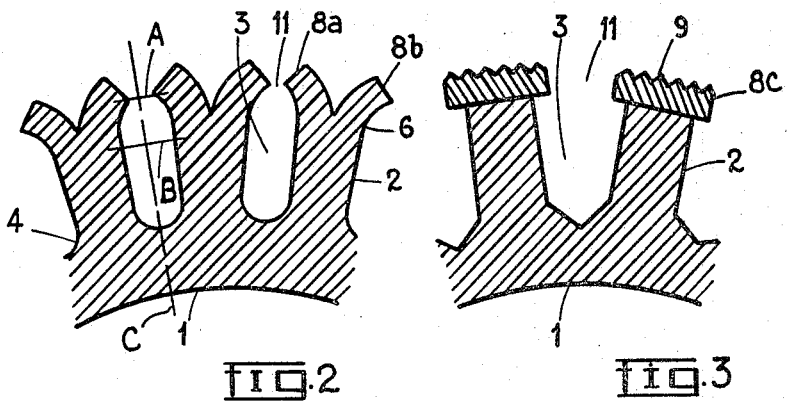

FIG. 2 shows, in transverse section, an anode heat radiator in accordance with the present invention, having vertical protuberances 2 in the form of ribs. The end portions 6 of these ribs are slit longitudinally and symmetrically bent back to form two outwardly flaring wings 8a, 8b, arranged symmetrically side by side with respect to the ribs. Ribs 2, and the end portions 8a, 8b, define vertical channels 3 which communicate with the exterior space of the radiator arrangement by means of opening 11 having a cross section much less than the longitudinal section of the channels 3 themselves, as best seen at dimension lines A, B, FIG. 2 with respect to the median of channel 3 indicated at C. Experience has shown that constricting the opening of channels 3, as at A, prevents instability of heat exchange, without preventing a highly turbulent liquid flow due to thermal syphon action. It is believed that the surprisingly increased heat dissipation of the structure according to the present invention can be explained as follows: assume a structure according to FIG. 1 having, however, an outer or circumferential enclosure closing off the channel 3. The outer cylindrical covering may be considered similar to the terminal end portions, or the extensions 8 of FIG. 1, in contact with a liquid. A temperature gradient thus is established in a radial direction in the metal portions separating the channels 3. A turbulent, and rapid current of cooling liquid will result, established by thermal siphon action, in the vertical channels. At low heat dissipation rates, the lower portions of the channel will contain a substantial amount of non-evaporated liquid, the vapor being exclusively evaporated towards the top. At increased heat dissipation rates, however, the lower portions of the channels will also contain boiling liquid. The steam pressure will overcome the weight of the light steam liquid mixture in the lower portion and escape from both the top and the bottom of the channels, thus interrupting supply of fresh liquid to the sides 5 of the protuberances 2. Hot spots, caused by loss of contact with liquid, will cause instability and limit the heat dissipation rate.

The structure according to the present invention retains the advantages of closed channels in respect to establishing a rapid current of cooling liquid by thermal-siphon action. The difficulty of loss of liquid contact within the channels themselves is avoided by the opening 11, permitting escape of steam towards the outside. In addition, due to the temperature gradient within the protuberances themselves, the boiling action along the sides 5 of the ribs will be stabilized because the radial dimension of the sides is increased, and particularly the outer region of the channel will be kept in contact with liquid which has not yet been boiled, since the outside of the protuberances themselves are still immersed in liquid.

FIG. 3 shows, in transverse section, a portion of an anode radiator having ribs or humps 2 extending lengthwise of the anode, with metal strips 8c soldered to the ends thereof. These strips, wider than the ribs themselves, constrict the outer openings of the channels 3. In order to increase the surface area, strips 8c may be provided with corrugations or knurling 9.

Figure 4:
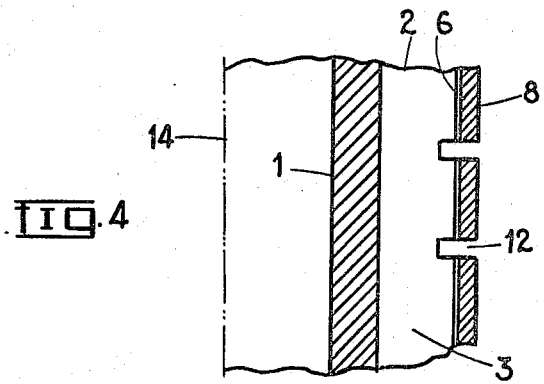

FIG. 4 shows, in longitudinal section, the massive vertical ribs having a common terminal portion 8, formed as a shroud of a metal which is a good heat conductor, soldered to the ends 6 of the protuberances 2. The central axes of the otherwise circular radiator is shown at 14. The channels 3, bordered on their sides by the ribs 2, and shroud 8 are in communication with the exterior by their open top and bottom ends, as well as by lateral apertures 12 which may, for example, be cut into the terminal portions 8 of ribs 2.

FIG. 5 shows, in transverse section, the radiator element having similar characteristics, but arranged for manufacture by casting. The heat dissipating element consists of a cylindrical block, in which, by means of cores, vertical channels 3 are cast. Apertures 13, which may be cylindrical, provide communication between channels 3 and the region exterior of the radiating body. Instead of holes 3, circumferential circular, or helically arranged grooves of sufficient depth to penetrate into channel 3 may be provided. The temperature gradient in the body according to FIG. 5 is established in the metal ribs 2 separating the channels 3. The exterior surface of the heat radiating body may again be knurled, or corrugated, in order to increase the contact surface with the cooling liquid.

FIG. 6 illustrates, again in transverse section, a radiator which may be similar to that of FIG. 4, that is a shroud of good heat conducting metal and in good thermal contact with ends 6 of ribs 2. This shroud may simply be a perforated sheet metal cylinder having a substantial number of holes placed at random. If the number of holes is large enough, no special care need be taken to provide for registration between all holes and the channels, but some may cover the ribs 2. A single perforated cylinder thus may serve as shroud for a large number of radiating bodies. Radiating bodies in accordance with the invention may thus be provided by modifying already existing anode elements, manufactured according to the prior art, and having aligned, or staggered protuberances.

It has already been proposed to locate a separating element beyond the radiating body in order to separate the rising, and descending streams of cooling fluid. The efficiency of heat transfer of a body in accordance with the present invention may also be improved by the provision of a deflection element. Cylinder 10, shown only in FIG. 6, but equally applicable to the embodiments of FIGS. 2–5, and open at its upper and lower ends, is located coaxially between the radiator and the outer wall of the liquid container 15. Support elements for cylinder 10, not shown in the drawing, may be fixed either to the radiator body 1, or to the boiler or housing 15. With cylinder 10, a rapid current of liquid will flow not only in channels 3, but also in the space between the radiator shroud 8 and cylinder 10; the return flow for this current of cooling liquid will be in the space between cylinder 10 and the outer wall 15 of the boiler assembly.

The present invention has been described in connection with the cooling of a high-power vacuum tube, but may also be used for exchange with other elements, where high thermal flux, and high rate of exchange of heat is desired.

I claim:

1. An evaporative cooling arrangement for a body having a high thermal flux comprising a radiator surrounding said body in thermal contact therewith, said radiator being adapted for immersion in a liquid within a container, said radiator having elongated protuberances, the dimensions of which are large in relation to the vapor bubbles formed on their surface by boiling of said liquid; adjacent protuberances defining flow channels extending substantially throughout the length of the radiator; said protuberances being formed with outer end portions, adjacent ones extending towards and facing each other without closing off said channels in an outward direction to provide communication of said flow channels laterally outwardly therefrom through openings of lesser dimension than the width of said channels.

2. Arrangement as claimed in claim 1, wherein said protuberances comprise longitudinal ribs and the outer end portions of each rib comprises portions which are symmetrically bent back in opposite directions with respect to the median plane of the rib.

3. Arrangement as claimed in claim 1 including metal strips attached to the outer end portions of the protuberances, said strips extending partially over said flow channels.

4. Arrangement as claimed in claim 1 wherein the outer end portions comprise an elongated sheet of heat conducting materials surrounding and in contact with the ends of the protuberances, said sheet being opened at both its ends and formed with a plurality of holes therethrough communicating with the flow channels between the protuberances.

5. Arrangement as claimed in claim 4, said radiator and said sheet comprising an integral metal casting.

6. Arrangement as claimed in claim 1 in combination with a deflection shield spaced from said outer end portions.

7. A high-power electronic tube having an anode, an anode radiator coaxially surrounding said anode in thermal contact therewith, means for maintaining a body of liquid in contact with the outer surface of said radiator, the radiator having radial elongated protuberances the dimensions of which are large in relation to the stam bubbles formed on their surface by the boiling of said liquid; adjacent protuberances defining flow channels extending substantially the length of said anode radiator; said protuberances being formed with outer end portions, adjacent ones extending towards and facing each other without closing off said channels in an outward direction to provide communication of said flow channels laterally outwardly therefrom through openings of lesser dimension than the width of said channels.

8. Electronic tube, as claimed in claim 7, said protuberances comprising longitudinal ribs formed with outer end portions symmetrically bent back in opposite directions with respect to the median plane of the rib.

9. Tube as claimed in claim 7, wherein the outer end portions of the protuberances comprise metal strips attached to the ends of the protuberances.

10. Tube as claimed in claim 7, wherein the outer end portions are formed by a cylinder of heat conductive material surrounding and in contact with the ends of the protuberances, said cylinder being open at both its longitudinal ends and having a plurality of apertures formed therethrough communicating with said flow channels between protuberances.

11. Electronic tube as claimed in claim 10, said radiator and surrounding cylinder forming an integral casting.

References Cited by the Examiner

UNITED STATES PATENTS 2,873,954   2/1959   Protze _____ 165—74

FOREIGN PATENTS 1,226,420   10/1957   France.

ROBERT A. O'LEARY, *Primary Examiner.*

CHARLES SUKALO, *Examiner.*